(12) United States Patent
Chenna (10) Patent No.: US 9,363,259 B2
(45) Date of Patent: *Jun. 7, 2016

(54) PERFORMING CLIENT AUTHENTICATION USING ONETIME VALUES RECOVERED FROM BARCODE GRAPHICS

(71) Applicant: SYMANTEC CORPORATION, Mountain View, CA (US)

(72) Inventor: Srinivas Chenna, Bangalore (IN)

(73) Assignee: SYMANTEC CORPORATION, Mountain View, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 13/900,929

(22) Filed: May 23, 2013

(65) Prior Publication Data
US 2014/0351589 A1    Nov. 27, 2014

(51) Int. Cl.
*H04L 29/06* (2006.01)
*H04L 9/32* (2006.01)
*G09C 5/00* (2006.01)

(52) U.S. Cl.
CPC .............. *H04L 63/0823* (2013.01); *G09C 5/00* (2013.01); *H04L 9/3271* (2013.01); *H04L 63/0853* (2013.01)

(58) Field of Classification Search
CPC ..... H04L 63/08; H04L 9/3271; H04L 63/083; H04L 63/0823; H04L 63/0428; H04L 9/18; H04L 9/00; H04L 9/3281
USPC .......................................................... 713/168
See application file for complete search history.

(56) References Cited

U.S. PATENT DOCUMENTS

| 8,769,304 B2 * | 7/2014 | Kirsch .......................... 713/189 |
| 2008/0016307 A1 | 1/2008 | Takano et al. |
| 2012/0308003 A1 | 12/2012 | Mukherjee |
| 2013/0124422 A1 * | 5/2013 | Hubert et al. ................... 705/71 |
| 2013/0145151 A1 | 6/2013 | Brown et al. |
| 2013/0152176 A1 * | 6/2013 | Courtney et al. ................. 726/5 |
| 2014/0085309 A1 | 3/2014 | Czapar |
| 2014/0108810 A1 | 4/2014 | Chenna |
| 2014/0339312 A1 * | 11/2014 | Simske et al. ........... 235/462.04 |
| 2015/0052361 A1 * | 2/2015 | Winkler-Teufel ............. 713/171 |

OTHER PUBLICATIONS

"Decryptable to Your Eyes: Visualization of Security Protocols at the User Interface", DaeHun Nyang, Abedelaziz Mohaisen, Taekyoung Kwon, Brent Kang, Angelos Stavrou, Cornell University Library, Dec. 10, 2011, pp. 1-15.*
Lee, M. "Open sesame: Google's no-password log-in", Jan. 17, 2012. http://www.zdnet.com/open-sesame-googles-no-password-log-in-1339329832/.

* cited by examiner

*Primary Examiner* — Mohammad A Siddiqi
(74) *Attorney, Agent, or Firm* — Patterson & Sheridan, LLP (57) ABSTRACT

Techniques are disclosed for authenticating users accessing computing applications, e.g., applications hosted in a cloud environment accessed using a variety of computing systems. As disclosed, an authentication process is performed using a certificate and private key installed on a mobile device and a nonce generated on the server. To authenticate a user, a server generates a nonce, encrypts the nonce with a public key associated with the user, and encodes the encrypted nonce in a barcode graphic (e.g., a QR code). The resulting barcode graphic is displayed to the user, and a mobile device scans the barcode graphic to recover the encrypted nonce. The encrypted nonce is decrypted using a private key stored on the mobile device. The clear text nonce is then displayed on the screen of the mobile device and used as a one-time password (OTP) for authentication.

12 Claims, 7 Drawing Sheets

PERFORMING CLIENT AUTHENTICATION USING ONETIME VALUES RECOVERED FROM BARCODE GRAPHICS

BACKGROUND

1. Field

Embodiments of the invention generally relate to techniques for authenticating users in accessing computing applications. More specifically, techniques are disclosed for performing authentication using a certificate store on a mobile device and a nonce generated on a server.

2. Description of the Related Art

Protecting access to computing systems is a well known issue in a broad variety of contexts. For example, it is common for a computing application to require users to provide a username and password. As more computing applications are accessed in a distributed manner, e.g., by accessing applications hosted in a cloud based environments, simple passwords frequently provide inadequate security. That is, passwords suffer from a number of known drawbacks, primarily in that they may be forgotten, guessed, or otherwise disclosed or obtained. For example, users frequently choose insecure passwords that can be broken using a "dictionary" attack.

A variety of techniques have been developed to improve security and provide more reliable authentication mechanisms. For example, one solution is to use one-time passwords (OTP) generated using a shared secret held by a client and an authentication system. In addition to authenticating a user based on a username and password, the shared secret is used to compute a OTP which is valid for brief period of time or for a single use. However, a security breach at the server can potentially compromise the shared secret for an entire population of users.

Another approach includes using strong authentication solutions like public key infrastructure (PKI). PKI presents a number of challenges, particularly for applications that can be accessed from anywhere, e.g., an application deployed on a computing cloud. In such a case, a user may require access to their certificates from different computing devices, but a certificate installed on one computer cannot be used from other devices without copying the private key to each device. This prevents the "on demand from anywhere" access desired for some applications. Installing a certificate (and private key) on a hardware token gives the flexibility to access the certificate store from multiple computers, but the requirements of an available of USB interface and ability to install device drivers on a given machine can limit this flexibility. Generally, if a user's keys are installed on a computer key store, the user will not be able to access them from other computing devices. Even if the keys are stored on a hardware token, the user requires proper device drivers to access the keys. Further still, deploying PKI solutions is complicated due to various browser, OS, certificate stores and application dependencies.

SUMMARY

Embodiments presented herein include a method for authenticating a client device requesting access to a computing application. This method may generally include, in response to receiving a request to access the computing application, encrypting a first nonce using a public key associated with the user and encoding the encrypted nonce in a barcode graphic. This method may also include sending the barcode graphic to the client device as a second factor authentication challenge, and receiving, from the client device, a response to the challenge which includes a second nonce. Upon determining the second nonce matches the first nonce, the client device is granted access to the computing application.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments presented herein provide techniques for authenticating users accessing computing applications, e.g., applications hosted in a cloud environment accessed using a variety of computing systems. More particularly, embodiments of the invention provide an authentication process performed using a certificate and private key installed on a mobile device and a nonce generated on the server. In one embodiment, to authenticate a user, a server generates a nonce to use for an authentication challenge, encrypts the nonce with a public key of the user, and encodes the encrypted result as a bar code (e.g., a QR code). The resulting barcode graphic code is displayed to the user, and a mobile device, e.g., a Smart phone, is used to scan the barcode graphic to recover the encrypted nonce and to decrypt it with a private key stored on the mobile device. The clear text nonce is then displayed on the screen of the mobile device and used as a one-time password (OTP) for authentication.

As stated, embodiments use PKI techniques for encrypting a nonce generated on the server which is sent to the user encoded as barcode graphic, such as a QR code. Since the nonce is encrypted with the user's public key it can only be decrypted using the corresponding private key, which is installed on the user's mobile device. Doing so allows the private key to be stored in a secure key store of the mobile device, while accessed generally from anywhere. Once the nonce is decrypted, it is displayed on the mobile screen and used as a OTP for second factor authentication. The nonce is a clear text string and can be configured to any length as required by security needs and the application needs. This approach eliminates the need for a shared secret, but retains the ease of use of an OTP solution. Further, this approach eliminates some issues in PKI deployment as the mobile device maintains the lifecycle of a user's certificate, eliminating the need for an application developer to address numerous combinations of certificate stores, operating systems, device drivers, and browsers, but retains the strong security aspects.

Thus, techniques disclosed herein allow users to authenticate themselves using virtually any computing device that can access an application over a network. That is, the authentication process described herein can be performed "on demand from anywhere," while providing a cryptographically secure process resistant to a variety of attacks.

In the following, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. In context of the present invention, a cloud based application may be configured to provide a second factor authentication challenge to users in the form of an encrypted nonce encoded in a barcode graphic. In response, a user recovers the encrypted nonce using a barcode scanner and decrypts the nonce using a private key stored on a mobile device. The one time password is then supplied to the relying application in the cloud (whether the cloud itself is provided by the enterprise or a third party). Also note, while described herein using a reference example of a QR code encoding an encrypted nonce as part of the authentication challenge, one of ordinary skill in the art will recognize that any barcode or graphical symbols capable of encoding both the encrypted nonce may be used.

Figure 1:
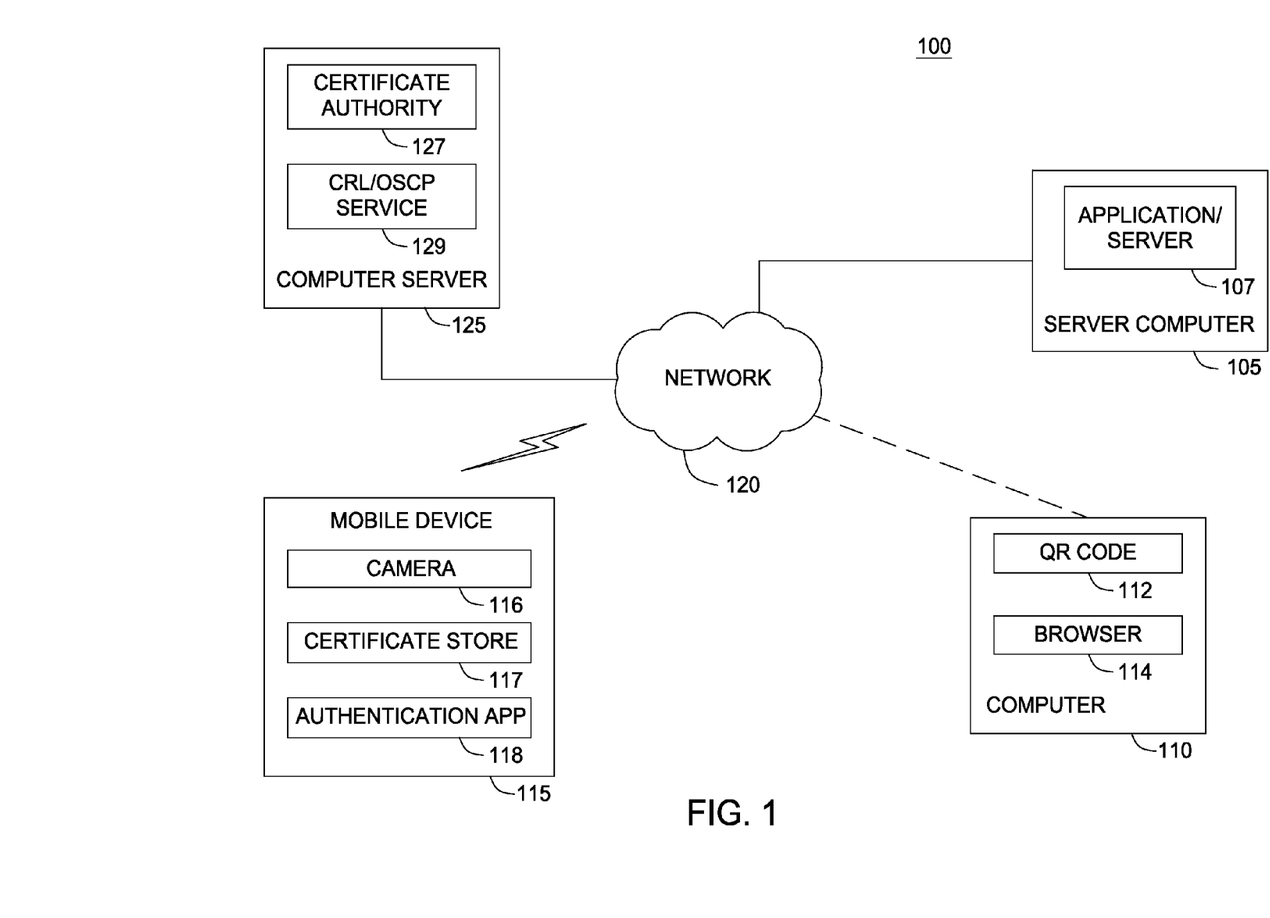
FIG. 1 illustrates an example computing environment, according to one embodiment.

FIG. 1 illustrates an example computing environment 100, according to one embodiment. The computing environment 100 allows a user to perform a client authentication process using a certificate in a certificate store 117 on mobile device 115. As shown, the computing environment includes a server computer 105 hosting a computing resource (e.g., application/service 107). The server computer 105 may be a physical computing system (e.g., a system in a data center) or may be a virtual computing instance executing within a computing cloud. In any event, the computing system 105 hosts an application/service 107 (also referred to as a relying application) accessed by clients using computing system 110. In one embodiment, the relying application 107 authenticates a user a by sending an authentication challenge encoded in a barcode (e.g., a QR code 112) to computing system 110 over a network 120 (e.g., the internet). In one embodiment the QR code may be rendered as a login page on browser 114 of computing system 110.

In one embodiment, the relying application 107 maintains user certificates in a local database. Alternatively, the relying application can retrieve a user certificate from a search service (e.g., an LDAP service) hosted by certificate authority 127. Either approach allows the relying application 107 to access a public key associated with a given user. Further, the relying application 107 may be configured to confirm that a given user's certificate is valid and not revoked as part of the authentication process by communicating with CRL/OSCP service 129 on CA server 125.

In one embodiment, the relying application 107 authenticates a user by validating a username and password, and based on the username, identifies a PKI certificate (and public key) associated with the user. The relying application 107 then generates a nonce, (e.g., a 12-byte random number) and encrypts the nonce using the public key associated with the user. The relying application 107 encodes the encrypted nonce in a barcode a (e.g., QR code 112) and returns the barcode graphic for presentation to the user. For example, the QR code 112 may be presented to the user on a login page rendered on browser 114.

In an alternative embodiment, the certificate authority 127 may act as an identity authority and identify the appropriate public key associated with a user, validate that user's certificate, and generate the nonce to use for the second factor authentication challenge. In such an embodiment, the relying application 107 passes the username requesting access to the certificate authority and receives back a nonce encrypted using that user's public key (or the barcode graphic encoding same). Of course the functions of the certificate authority 127 and relying application in performing the second factor authentication process described herein can be separated or combined as appropriate for a particular case.

Once displayed, the user invokes an authentication app 118 installed on the mobile device 115 and points a camera 116 at the login page to capture an image of the QR code 112. The authentication app 118 recovers the encrypted nonce and decrypts it using the private key corresponding to a certificate in the certificate store 117. Note, a user may have to provide a password or pin to the authentication app 118 to access the private key in the certificate store 117. Once decrypted, the nonce value is displayed on the mobile device and the user can then enter it into the form on the browser 114.

Once received, the relying application 107 validates the nonce received from the user matches the nonce value generated by the relying application 107 (or CA 127) and that the nonce remains valid for the second factor authentication. Based on the authentication status, the relying application 107 either grants or denies access to the requested resources on server 105 (e.g., cloud-based computing applications). In an alternative embodiment, the relying application passes the nonce value received from the browser 114 to the CA 127, acting as an identity authority, and receives a response indicating whether the second factor authentication challenge was successful. In such a case, the relying application 107 then grants or denies access based on the response from the CA 127.

Figure 2:
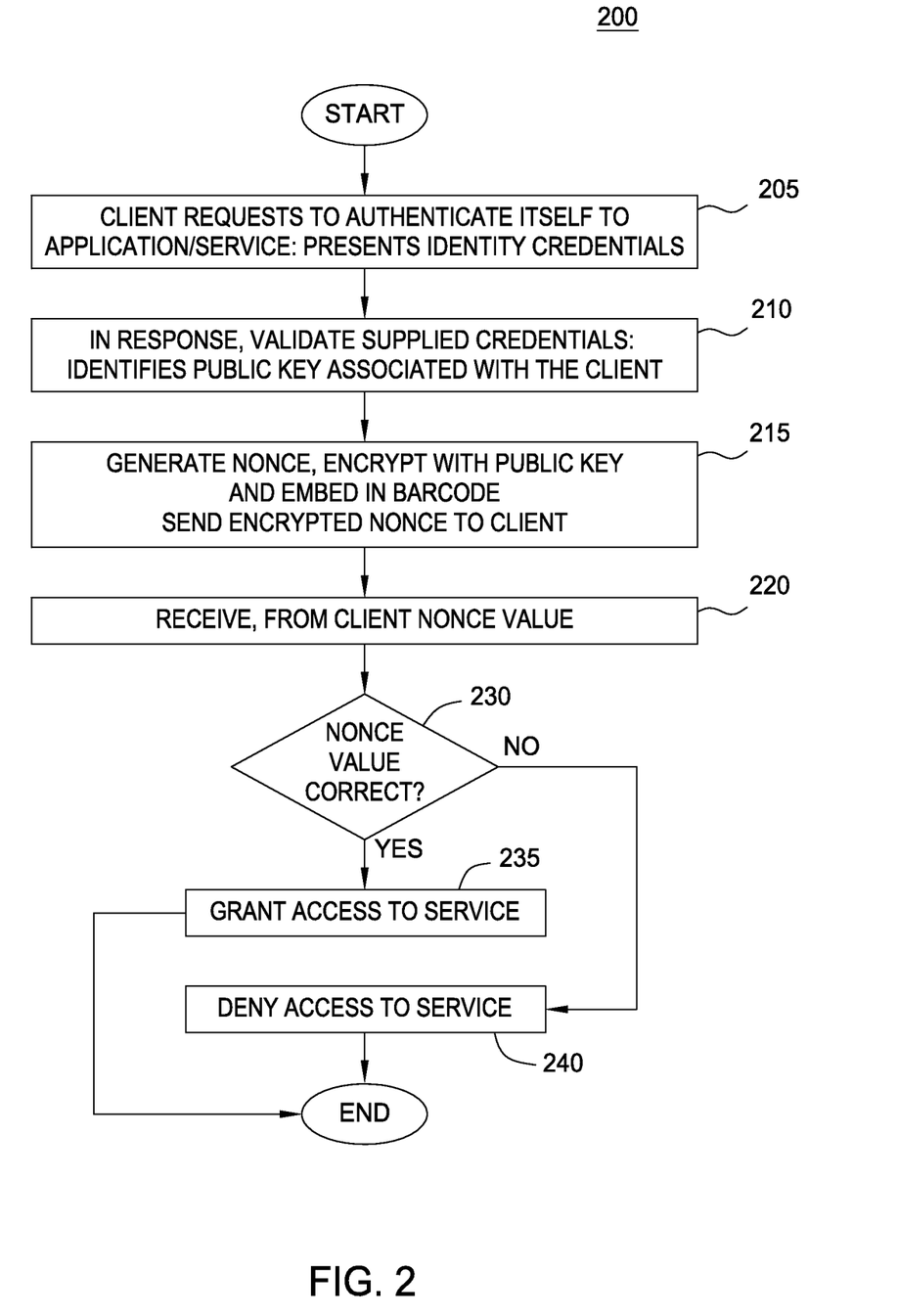
FIG. 2 illustrates a method for authenticating a user requesting access to an application, according to one embodiment.

FIG. 2 illustrates a method for authenticating a user requesting access to an application, according to one embodiment. More specifically, method 200 illustrates the authentication process described above from the perspective of the relying application 107. As shown, the method 200 begins at step 205, where an application (again, referred to as the relying application) receives an access request from a user. The request may include a proffered set of credentials, e.g., a username and password (or values derived from the username and password) used to perform a first factor authentication. At step 210, the relying application validates the credentials received from the user. Assuming the credentials are validated, the relying application then identifies a certificate associated with the requesting user. Optionally, the relying application may validate the certificate with the issuing certificate authority. At step 215, the relying application generates a nonce and encrypts it with the public key named in the certificate identified at step 210. The resulting encrypted package is then encoded in a barcode graphic, such as a QR code. The graphic image is then passed back to the requesting client as a second factor authentication challenge. As noted above, in an alternative embodiment, the relaying application interacts with an identity authority to obtain the encrypted nonce value. In such an embodiment, the identity authority may perform elements of steps 210 and 215.

At step 220, the relying application receives a nonce value from the requesting client. At step 230, the relying application determines whether the nonce value is correct 230, thereby completing the second factor authentication process. Specifically, the relying application compares the nonce value received from the requesting client (at step 220) to the nonce value generated by the relying application (at step 215). If the values match, then the relying application may conclude that the requesting client is authenticated and, at step 235, grant access to the application. Otherwise, if the values do not match, then at step 240, the relying application denies access to the application. Note, the relying application may also validate that the nonce itself has not expired (or otherwise become invalid). For example, a nonce may have a limited validity period after which it cannot be used to perform the second factor authentication.

In an embodiment where the relying application interacts with an identity authority, the response received from the requesting client is passed to the identity authority and the relying application receives a response indicating whether the requesting client successfully completed the second factor authentication challenge.

Figure 3:
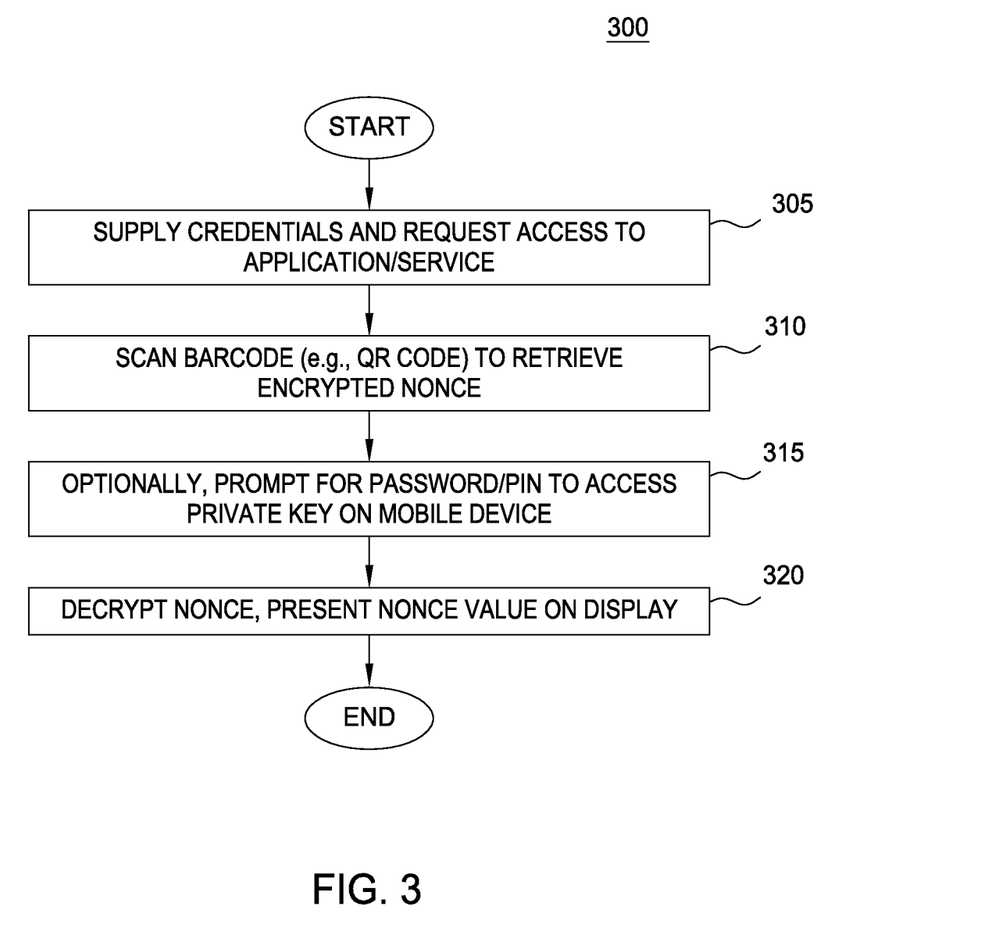
FIG. 3 illustrates a method for a mobile device to recover a one-time password to authenticate a user, according to one embodiment.

FIG. 3 illustrates a method 300 for a mobile device to provide an authentication message to a relying application, according to one embodiment.

As shown, the method 300 begins at step 305, where a user requests access to an application or service accessed over a network (e.g., an application hosted in a computing cloud). As part of the request, the user may supply credentials such as a username and password (or values derived from a username and password). In response, the relying application generates a barcode graphic (e.g., a QR code) storing an encrypted nonce. Again, the nonce is encrypted using a public key associated with the user and rendered on a computer display.

The remaining steps of method 300 illustrate the authentication process described above from the perspective of the authentication app 118 on mobile device 115. At step 310, the authentication app 118 on a mobile device (e.g., a Smartphone or computing tablet) scans the QR code to recover the encrypted nonce. At step 315, the authentication app (or certificate store on the mobile device) may prompt the user to supply authenticating credentials prior to accessing the private key stored on the mobile device. For example, the authentication app may prompt a user to enter a pin code or password to access the private key certificate store. At step 320, the authentication app decrypts the encrypted nonce value and displays it on the mobile device.

Figure 4:
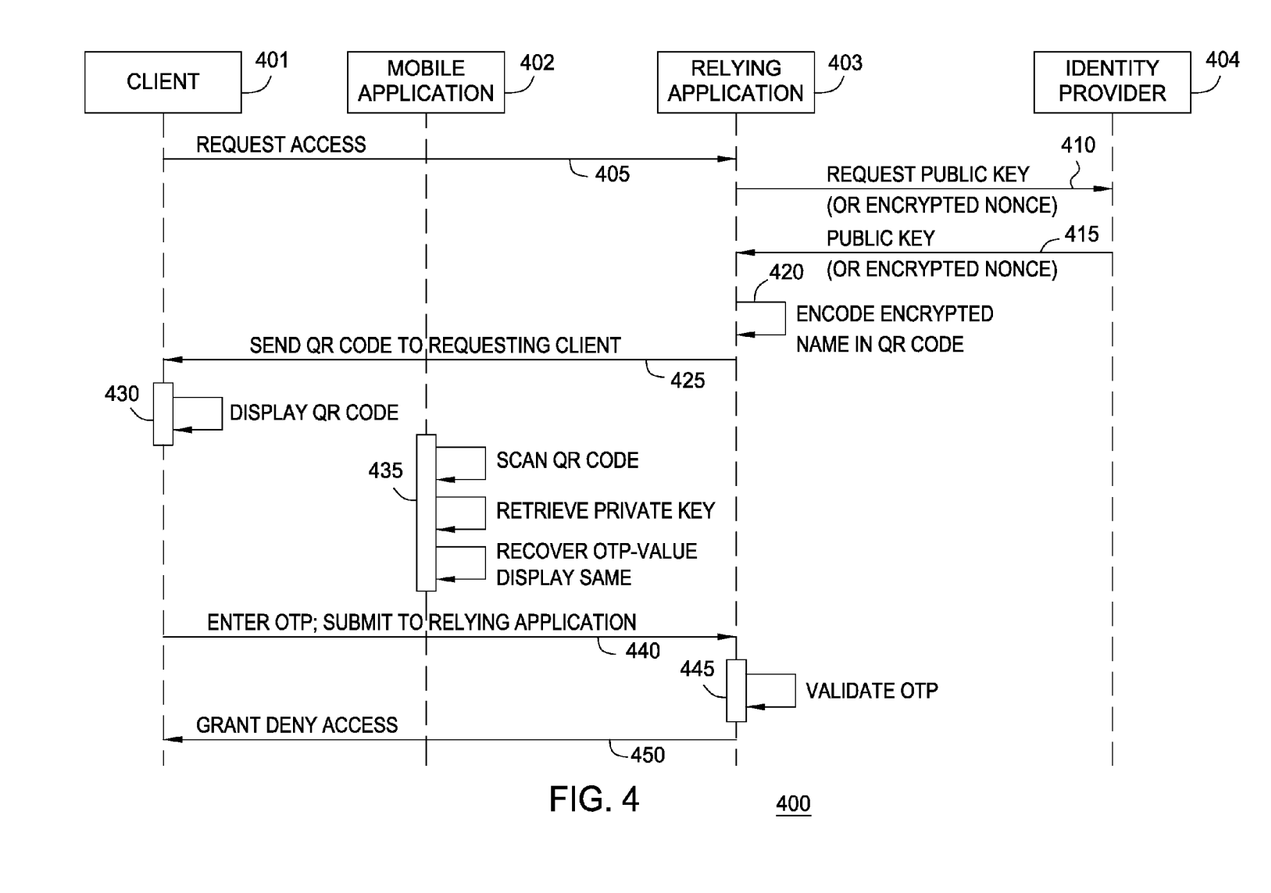
FIG. 4 illustrates a sequence diagram 400 for performing a second factor authentication challenge using a certificate store and barcode scanner on a mobile device, according to one embodiment.

FIG. 4 illustrates a sequence diagram 400 for performing a second factor authentication challenge using a certificate store and barcode scanner on a mobile device, according to one embodiment. As shown, a client 401 requests access to an application or service (at 405). At 410, the application 403 requests a public key to use to entry a nonce used as a one-time password. As noted, the application 403 may send a request for a certificate associated with the client requesting access to identity provider 404. Alternatively, the application 403 may maintain a store of user certificates and identify the appropriate user certificate (and public key) from this store. At 415, the relying application 403 receives a public key corresponding to the client 401 requesting access. Once received, the relying application 403 generates a nonce value and encrypts it using the public key. Alternatively, the relying application 403 may receive an encrypted nonce from identity provider 404. In either case, at 420, the relying application encodes the nonce value, encrypted with the user's public key, in a QR code. And at 425, the encrypted once is returned to the requesting client 401.

At 430, the requesting client displays the QR code received from the relying application. At 435, the mobile app 402 then scans the QR code (e.g., using a camera on a mobile phone). The mobile app 402 also retrieves a private key associated with the user, decrypts the encrypted nonce using this private key, and recovers the nonce. The nonce value is then displayed on the screen of the mobile device. At 440, the user enters the nonce in an entry field of a user interface as a one-time password value and submits it to the relying application 403. At 445, the relying application validates the one-time password. That is, the relying application compares the nonce value sent to the client with the one received from the client to determine a result of the second factor authentication challenge. Alternatively, the relying application 405 may pass the OTP value received from the client to the identity provider 404 and receive back an authentication status. Lastly, at 450 the relying application 403 grants (or denies) access to the requesting client based on the authentication status.

Figure 5:
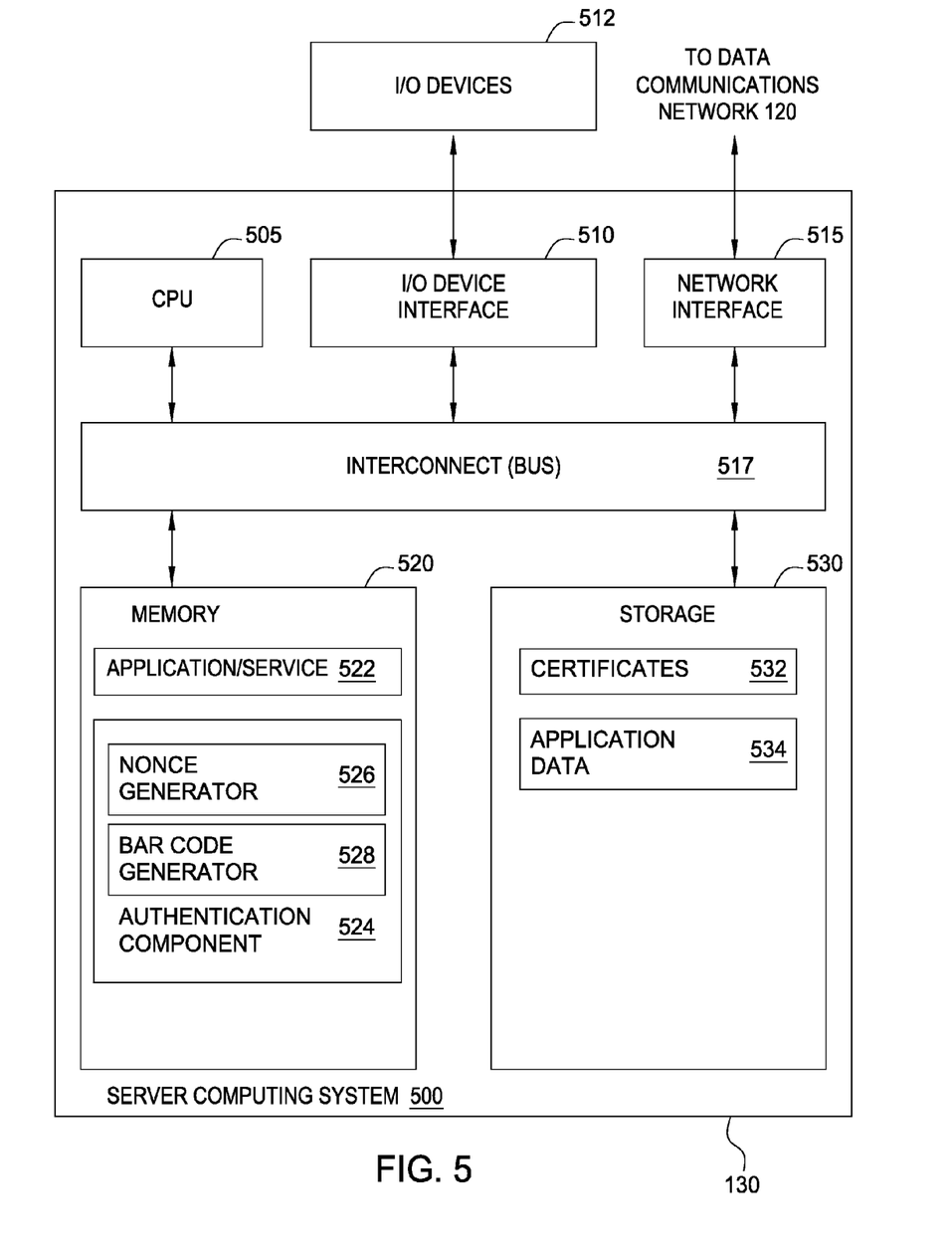
FIG. 5 illustrates an example computing system configured with a relying application configured to authenticate users with a barcode challenge, according to one embodiment.

FIG. 5 illustrates an example computing system 500 configured with a relying application configured to authenticate users with a barcode challenge, according to one embodiment. As shown, the computing system 500 includes, without limitation, a central processing unit (CPU) 505, a network interface 515, a network interface 515, a memory 520, and storage 530, each connected to a bus 517. The computing system 500 may also include an I/O device interface 510 connecting I/O devices 512 (e.g., keyboard, display and mouse devices) to the computing system 500. Further, in context of this disclosure, the computing elements shown in computing system 500 may correspond to a physical computing system (e.g., a system in a data center) or may be a virtual computing instance executing within a computing cloud.

The CPU 505 retrieves and executes programming instructions stored in the memory 520 as well as stores and retrieves application data residing in the memory 530. The interconnect 517 is used to transmit programming instructions and application data between the CPU 505, I/O devices interface 510, storage 530, network interface 515, and memory 520. Note, CPU 505 is included to be representative of a single CPU, multiple CPUs, a single CPU having multiple processing cores, and the like. And the memory 520 is generally included to be representative of a random access memory. The storage 530 may be a disk drive storage device. Although shown as a single unit, the storage 530 may be a combination of fixed and/or removable storage devices, such as fixed disc drives, removable memory cards, or optical storage, network attached storage (NAS), or a storage area-network (SAN).

Illustratively, the memory 520 includes an application/service 522 and an authentication component 524. The authentication component 524 itself includes a nonce generator 526 and barcode generator 528. And the storage 530 includes one or more certificates 532 and application data 534. The application/service 522 generally provides one or more software applications and/or computing resources accessed over a network 120 by users. Prior to accessing a given the application/service 522, users may be required to authenticate themselves using the authentication process described herein. When a user requests access to the application/service 522, nonce generator 526 generates a nonce to encrypt (using a public key listed in a given user's certificate 532) and barcode generator 528 encodes the encrypted nonce in a QR code. The nonce provides a one-time password value used as a second factor authentication challenge transmitted to the client requesting access to the computing resources of the application/service 522. After sending the encrypted nonce to the client, the authentication component 528 receives a response which includes a copy of the nonce value supplied by the user. After the authentication component 528 verifies that the nonce value supplied by the user matches the once value sent to the user, the user is then granted access to the application.

Figure 6:
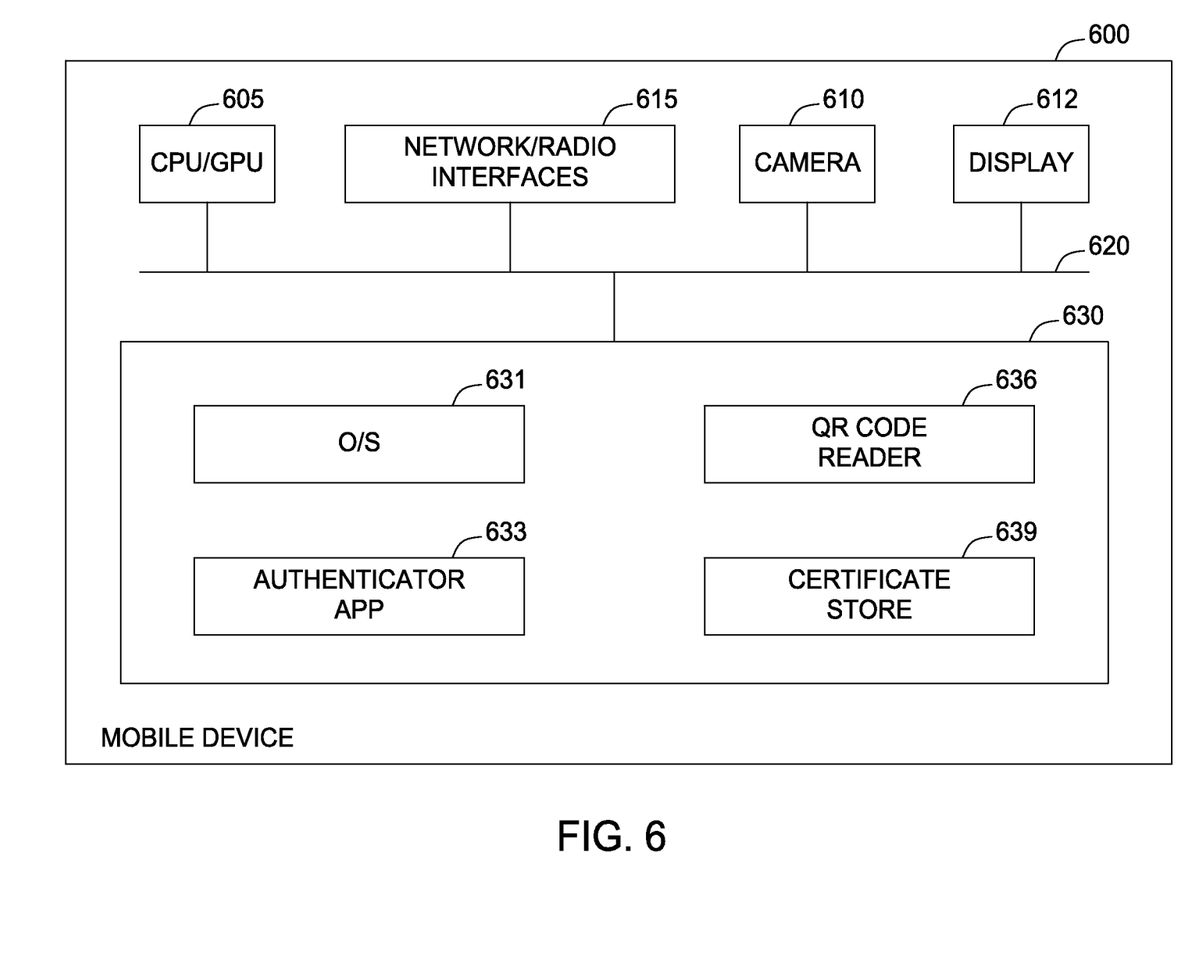
FIG. 6 illustrates an example mobile device used to respond to a second factor authentication challenge, according to one embodiment.

FIG. 6 illustrates an example mobile device 600 used to respond to a second factor authentication challenge, according to one embodiment. In this example, mobile device 600 is used to be representative of a mobile telephone (commonly referred to as a Smartphone) with a touch sensitive display 612 and a camera 610. Of course, embodiments of the invention may be adapted for use with a variety of computing devices, including PDAs, handheld video game systems, tablet computers, and other computing devices having a display screen and camera.

As shown, the handheld device 600 includes, without limitation, a central processing unit and graphics processing unit (CPU/GPU) 605, network/radio interfaces 615, an interconnect 620, and a memory 630. Of course, an actual handheld device will include a variety of additional hardware components.

The CPU/GPU 605 retrieves and executes programming instructions stored in the memory 630. Similarly, the CPU/GPU 605 stores and retrieves application data residing in the memory 630. The interconnect 620 is used to transmit instructions and data between the CPU/GPU, storage 630, network interfaces 615, and memory 630. CPU/GPU 605 is included to be representative of a single CPU, multiple CPUs, a single CPU having multiple processing cores, and the like. And the memory 630 is generally included to be representative of memory and storage on a mobile device, e.g., DDR and flash memory spaces.

Illustratively, the memory 630 includes a mobile operating system (O/S) 631, an authenticator app 633, a QR code reader 636, and a certificate store 639. The mobile O/S 631 provides software configured to control the execution of application programs on the mobile device 600. The authenticator app 633 generally provides a software application configured to decrypt an encrypted nonce value and present the nonce value on display 612. For example, the QR code reader 636 may be configured to access the camera 610 to recover the information encoded by a QR code. As noted, the QR code may encode an encrypted nonce used as a one-time password in a second factor authentication challenge. To generate a response, the authenticator app 633 may access a private key from the certificate store 639, decrypt an encrypted nonce, and display a copy of the nonce value on display 612.

Figure 7A:
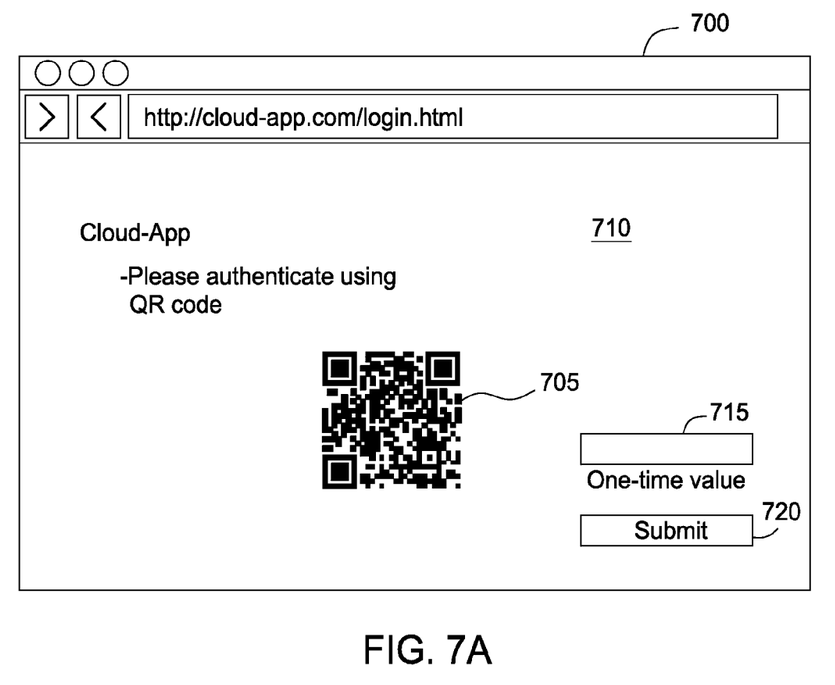
FIGS. 7A-7B illustrates example user interfaces used to perform a second factor authentication challenge, according to one embodiment.
Figure 7B:
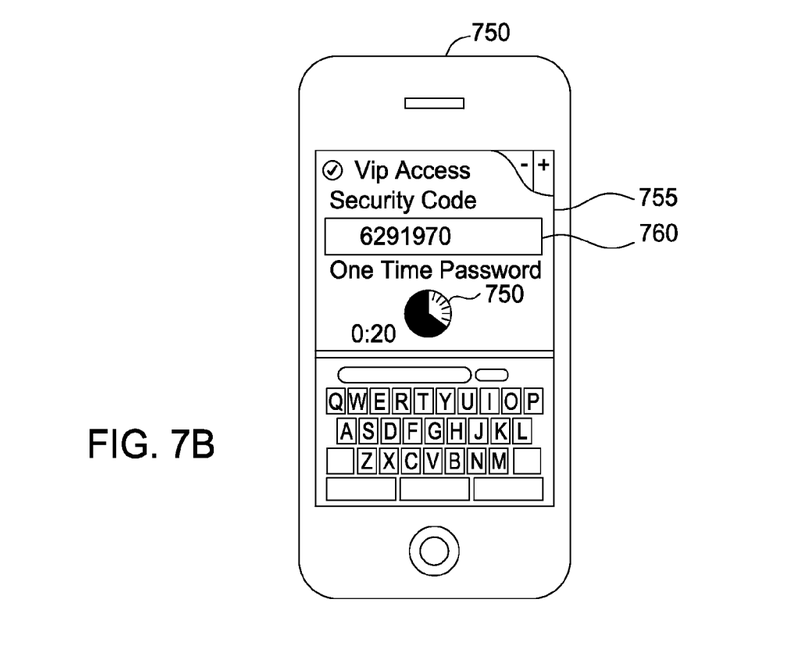

FIG. 7A illustrates an example logon interface 700 for a relying application, according to one embodiment. In this example, a user is presumed to have requested access to an application hosted in a computing cloud and provided a username and password. In response, the hosted application has transmitted a logon page 710 rendered by a browser on a client device. The logon page 710 includes a QR code 705, an entry field 715 for providing a one-time password value, and a submit button 720. As described, the user may scan the QR code 705 with a mobile device to retrieve an encrypted nonce encoded by the QR code. The mobile device then decrypts the nonce and presents the value to the user. The user then enters the nonce value in field 715 and presses submit button 720. FIG. 7B illustrates an example interface 755 on a mobile device 750 presenting a one-time password (OTP) value 760 to a user. As shown, the interface 755 includes the OTP value 760 and a timer 750 showing how long the current one-time value will remain valid.

As described, embodiments presented herein provide techniques for performing a second factor authentication process for a user requesting access to a cloud based or hosted application. As part of the authentication process, a relying application sends QR code that encodes an encrypted nonce used as a one-time password in the second factor authentication. The QR code is scanned by a mobile device with a key store storing a private key—corresponding to a public key used to encrypt the nonce value. Advantageously, this approach does not require a computing device to have a correct set of device drivers for hardware token or installing a copy of a private key on each device used to access the hosted application. Accordingly, embodiments provide an authentication process that allows users to access hosted applications in cases where it is unknown where the users will be accessing the hosted application from or what systems they will be using to access the hosted application.

While the foregoing is directed to embodiments of the present invention, other and further embodiments of the invention may be devised without departing from the basic scope thereof, and the scope thereof is determined by the claims that follow.

What is claimed is:

1. A method for authenticating a client device requesting access to a computing application, the method comprising:
   in response to receiving a request to access the computing application:
      encrypting a first nonce using a public key associated with the user, and
      encoding the encrypted nonce in a barcode graphic;
   sending the barcode graphic to the client device as a second factor authentication challenge, wherein the client device renders the barcode graphic on a display to be scanned by a mobile device and wherein the mobile device is configured to generate a second nonce by:
      scanning the barcode graphic to recover the encrypted first nonce,
      accessing a private key from a certificate store on the mobile device,
      decrypting the encrypted first nonce, and
      presenting, on a display of the mobile device, as the second nonce, the decrypted first nonce;
   receiving, from the client device, a response to the challenge which includes the second nonce; and
   upon determining the second nonce matches the first nonce, granting the client device access to the computing application.

2. The method of claim 1, wherein the barcode graphic is a QR code.

3. The method of claim 1, wherein the request identifies the user using a set of credentials based on a username and password.

4. The method of claim 3, wherein the public key is identified in a certificate associated with the user.

5. A non-transitory computer-readable storage medium storing instructions, which, when executed on a processor, performs an operation for authenticating a user requesting access to a computing resource, the operation comprising:
   in response to receiving a request to access the computing application:
      encrypting a first nonce using a public key associated with the user, and
      encoding the encrypted nonce in a barcode graphic;
   sending the barcode graphic to the client device as a second factor authentication challenge, wherein the client device renders the barcode graphic on a display to be scanned by a mobile device and wherein the mobile device is configured to generate a second nonce by:
      scanning the barcode graphic to recover the encrypted first nonce,
      accessing a private key from a certificate store on the mobile device,
      decrypting the encrypted first nonce, and
      presenting, on a display of the mobile device, as the second nonce, the decrypted first nonce;
   receiving, from the client device, a response to the challenge which includes the second nonce; and
   upon determining the second nonce matches the first nonce, granting the client device access to the computing application.

6. The computer-readable storage medium of claim 5, wherein the barcode graphic is a QR code.

7. The computer-readable storage medium of claim 5, wherein the request identifies the user using a set of credentials based on a username and password.

8. The computer-readable storage medium of claim 7, wherein the public key is identified in a certificate associated with the user.

9. A system, comprising:
   a processor; and
   a memory hosting an application, which, when executed on the processor, performs an operation for authenticating a user requesting access to a computing resource, the operation comprising:
      in response to receiving a request to access the computing application:
         encrypting a first nonce using a public key associated with the user; and
         encoding the encrypted nonce in a barcode graphic,
      sending the barcode graphic to the client device as a second factor authentication challenge, wherein the client device renders the barcode graphic on a display to be scanned by a mobile device and wherein the mobile device is configured to generate a second nonce by:
         scanning the barcode graphic to recover the encrypted first nonce;
         accessing a private key from a certificate store on the mobile device;
         decrypting the encrypted first nonce; and
         presenting, on a display of the mobile device, as the second nonce, the decrypted first nonce;
      receiving, from the client device, a response to the challenge which includes the second nonce, and
      upon determining the second nonce matches the first nonce, granting the client device access to the computing application.

10. The system of claim 9, wherein the barcode graphic is a QR code.

11. The system of claim 9, wherein the request identifies the user using a set of credentials based on a username and password.

12. The system of claim 11, wherein the public key is identified in a certificate associated with the user.

* * * * *